(12) United States Patent
Kim et al.

(10) Patent No.: US 12,210,125 B2
(45) Date of Patent: Jan. 28, 2025

(54) LiDAR DEVICE

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jungwoo Kim, Hwaseong-si (KR); Hyeongseok Seo, Suwon-si (KR); Jaehyuk Choi, Seoul (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 1005 days.

(21) Appl. No.: 17/136,620

(22) Filed: Dec. 29, 2020

(65) Prior Publication Data

US 2021/0247502 A1  Aug. 12, 2021

(30) Foreign Application Priority Data

Feb. 7, 2020  (KR) .................. 10-2020-0014991

(51) Int. Cl.
| | | |
|---|---|---|
| G01S 7/48 | (2006.01) | |
| G01S 7/4863 | (2020.01) | |
| G01S 7/4865 | (2020.01) | |
| G01S 17/10 | (2020.01) | |
| G01S 17/89 | (2020.01) | |

(52) U.S. Cl.
CPC .......... *G01S 7/4865* (2013.01); *G01S 7/4863* (2013.01); *G01S 17/10* (2013.01); *G01S 17/89* (2013.01)

(58) Field of Classification Search
None
See application file for complete search history.

(56) References Cited

U.S. PATENT DOCUMENTS

| | | | |
|---|---|---|---|
| 10,735,714 B2 | 8/2020 | Wang et al. | |
| 10,802,118 B2 | 10/2020 | Wang | |
| 11,233,966 B1* | 1/2022 | Niclass | ................. G01S 7/4861 |
| 2006/0202129 A1 | 9/2006 | Niclass et al. | |
| 2015/0041625 A1* | 2/2015 | Dutton | .................. G01T 1/2985 |
| | | | 341/166 |
| 2017/0052065 A1* | 2/2017 | Sharma | ................... G01S 17/18 |
| 2018/0164415 A1* | 6/2018 | Buckley | .................. G01S 17/18 |
| 2019/0049243 A1 | 2/2019 | Jung et al. | |
| 2020/0233068 A1* | 7/2020 | Henderson | .............. G01S 17/10 |

FOREIGN PATENT DOCUMENTS

| | | |
|---|---|---|
| KR | 1020180125882 A | 11/2018 |
| KR | 1020190067079 A | 6/2019 |

* cited by examiner

*Primary Examiner* — Hovhannes Baghdasaryan
(74) *Attorney, Agent, or Firm* — Sughrue Mion, PLLC

(57) ABSTRACT

A light detection and ranging (LiDAR) device may sequentially select each of a plurality of memory cells based on a coarse clock synchronized with a start signal generated when light is transmitted, may supply power to a plurality of memory cells based on a stop signal generated when light is received, and may calculate a time of flight (ToF) of light based on information of the power accumulated in the plurality of memory cells.

20 Claims, 6 Drawing Sheets

LiDAR DEVICE

CROSS-REFERENCE TO RELATED APPLICATION

This application claims priority from Korean Patent Application No. 10-2020-0014991, filed on Feb. 7, 2020, in the Korean Intellectual Property Office, the disclosure of which is incorporated by reference herein in its entirety.

BACKGROUND

1. Field

Apparatuses and methods consistent with embodiments of the disclosure relate to light detection and ranging (LiDAR) devices.

2. Description of Related Art

Light detection and ranging (LiDAR) systems are used in various fields, such as aerospace, geology, three-dimensional (3D) mapping, automobiles, robots, drones, etc.

A LiDAR device uses the time of flight (hereinafter referred to as ToF) as a basic operation parameter. For example, the LiDAR device may transmit light toward an object, receive back light through a sensor, and measure a flight time by using a high-speed electric circuit. Also, the LiDAR device may calculate a distance to the object from the flight time, and generate a depth image of the object by using the calculated distance for each coordinate of the object.

The ToF of the light may be calculated through statistical analysis of a histogram, but there is a problem in that calculation of the ToF through a histogram of the related art is performed by an off-chip digital signal processing method.

Accordingly, in order to solve these problems such as an increase in the number of channels in the off-chip digital signal processing method and a decrease in the readout speed, a technique for generating a histogram via an on-chip method is required.

SUMMARY

Embodiments address at least the above problems and/or disadvantages and other disadvantages not described above. Also, the embodiments are not required to overcome the disadvantages described above, and may not overcome any of the problems described above.

One or more example embodiments provide light detection and ranging (LiDAR) devices capable of generating a histogram of an on-chip type. The technical problems to be achieved are not limited to the above technical problems, and other technical problems may be inferred from the following embodiments.

According to an aspect of an example embodiment, there is provided a light detection and ranging (LiDAR) device including: a light transmitter configured to emit a light to an object; a light receiver configured to receive the light that is reflected from the object; a memory comprising a plurality of memory cells; a selector circuit configured to sequentially select each of the plurality of memory cells based on a coarse clock synchronized with a start signal that is generated at a light transmitting time at which the light is transmitted from the light transmitter; a power supply that supplies power to the plurality of memory cells based on a stop signal that is generated at a light receiving time at which the light is received by the light receiver; and a processor configured to determine a time of flight (ToF) of the light based on information of the power accumulated in the plurality of memory cells.

The selector circuit may be further configured to shift the start signal at an end of a period of the coarse clock in a first histogram generation mode for generating a coarse histogram that represents a distribution of the stop signal at a first resolution, and sequentially select each of the plurality of memory cells based on the shifted start signal.

The selector circuit may include a coarse clock distributor configured to simultaneously distribute the coarse clock to each of the plurality of memory cells.

The selector circuit may include at least one D flip-flop (DFF) configured to shift the start signal corresponding to a period of the coarse clock.

The selector circuit may include a stop signal distributor configured to simultaneously distribute the stop signal to each of the plurality of memory cells.

The power supply is further configured to supply a current to a memory cell selected by the selector circuit, among the plurality of memory cells, at a time when the stop signal is received in a first histogram generation for generating a coarse histogram that represents a distribution of the stop signal at a first resolution.

The power supply may include pulse generators respectively connected to an input terminal of each of the plurality of memory cells and configured to supply a current to each of the plurality of memory cells.

Each of the plurality of memory cells may include: a first switch connected to the power supply; a capacitor connected to the first switch and accumulate the power generated by the power supply; and a second switch connected in parallel to the capacitor and configured to discharge the capacitor.

Each of the plurality of memory cells may further include a third switch connected in parallel to the first switch and configured to maintain a constant voltage at an input terminal of each of the plurality of memory cells.

The LiDAR device may further include a comparator circuit connected to an output terminal of each of the plurality of memory cells and configured to compare a voltage of the capacitor in which the power is accumulated, with a reference voltage, and output the voltage of the capacitor when the voltage of the capacitor is greater than or equal to the reference voltage.

The comparison circuit may include a fourth switch configured to maintain the reference voltage and a fifth switch connected to the fourth switch and configured to be operated above the reference voltage.

The processor may be further configured to obtain information of a voltage of a capacitor included in each of the plurality of memory cells based on the information of the power accumulated in the plurality of memory cells.

The processor may be further configured to store information about at least one coarse memory cell having a voltage greater than or equal to a reference voltage, among the plurality of memory cells, and reset the voltage of the least one coarse memory cell.

The processor may be further configured to generate a time window corresponding to the information about the at least one coarse memory cell.

The selector circuit may be further configured to sequentially select each of the plurality of memory cells based on the coarse clock, in a first histogram generation mode for generating a coarse histogram that represents a distribution of the stop signal at a first resolution, delay the stop signal at a preset interval in a second histogram generation mode for generating a fine histogram that represents a distribution of the stop signal at a second resolution higher than the first resolution, and sequentially select each of the plurality of memory cells based on the delayed stop signal.

The selector circuit may include a plurality of delay cells delaying the stop signal and a delay locked loop (DLL) for synchronizing the delayed stop signal with a period of the coarse clock.

The power supply may supply, in a second histogram generation mode for generating a fine histogram that represents a distribution of the stop signal at a second resolution, a current to a memory cell selected by the selector circuit based on a coarse histogram that represents a distribution of the stop signal at a first resolution, wherein the second resolution may be higher than the first resolution.

The processor may be further configured to determine the ToF based on information about at least one fine memory cell having a voltage greater than or equal to a reference voltage among the plurality of memory cells.

The light receiver may include a single photon avalanche diode (SPAD).

The memory, the selector circuit, the power supply, and the processor may be integrated into a single.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
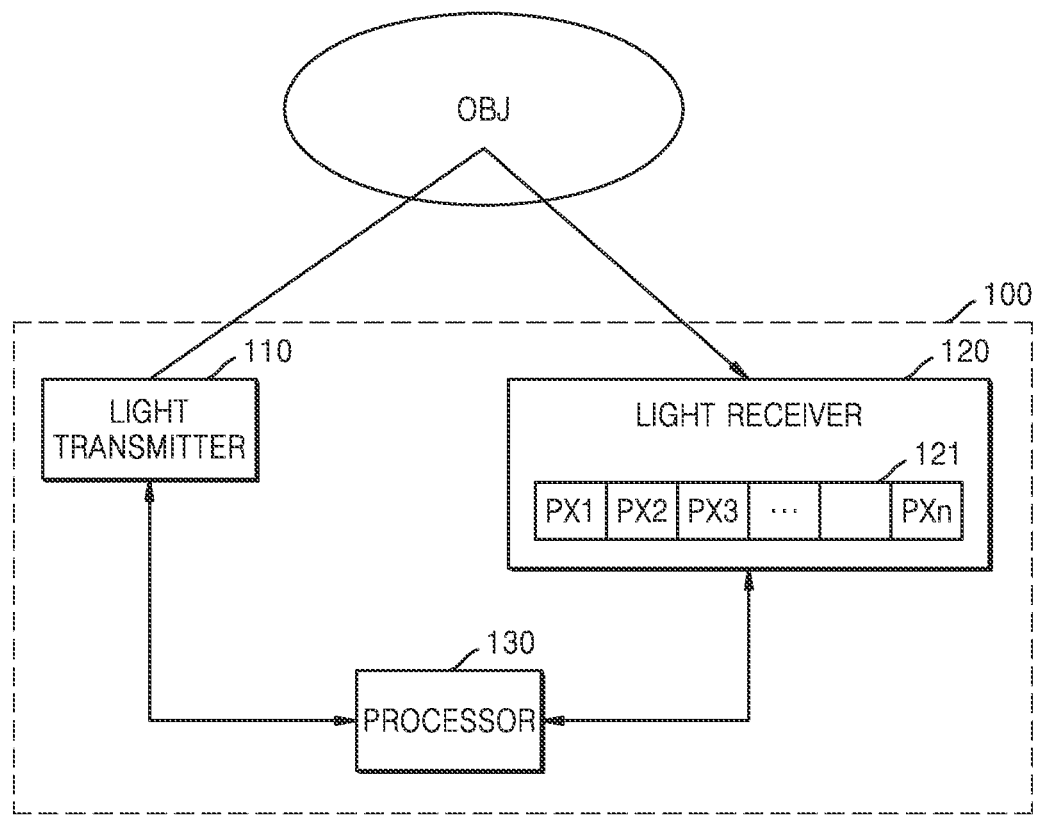
FIG. 1 is a block diagram showing a configuration of a LiDAR device according to an example embodiment.

Embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The phrases "in some embodiments" or "in one embodiment" appearing in various places in this specification are not necessarily all referring to the same embodiment.

Some embodiments of the present disclosure may be expressed as functional block configurations and various processing operations. Some or all of the functional blocks may be realized by various numbers of hardware and/or software that perform specific functions. For example, the functional blocks of the present disclosure may be realized by one or more microprocessors or by circuit configurations for a given function. Also, for example, the functional blocks of the present disclosure may be realized in various programming or scripting languages. The functional blocks may be realized in algorithms executing on one or more processors. In addition, the present disclosure may employ techniques of the related art for electronic environment setting, signal processing, and/or data processing. Terms such as "mechanism", "element", "means" and "configurations" may be widely used, and are not limited to mechanical and physical configurations.

In addition, the connecting lines or connecting members between the components shown in the drawings are merely illustrative of functional connections and/or physical or circuit connections. In a practical device, the connections between the components may be represented by various functional connections, physical connections, or circuit connections that may be replaced or added.

FIG. 1 is a block diagram showing a configuration of a LiDAR device 100 according to an example embodiment.

Referring to FIG. 1, the LiDAR device 100 may include a light transmitter 110, a light receiver 120 and a processor 130. The LiDAR device 100 may further include other general-purpose components in addition to the components shown in FIG. 1.

The light transmitter 110 may include at least one light source that radiates light. For example, the light source may radiate light in an infrared band. When light in the infrared band is used, mixing with natural light in a visible band including sunlight may be prevented. However, the present embodiment is not necessarily limited thereto, and the light transmitter 110 may include a light source irradiating light in various wavelength bands.

The light transmitter 110 may include a light source, such as a laser diode (LD), an edge emitting laser, a vertical-cavity surface emitting laser (VCSEL), a distributed feedback laser, a light emitting diode (LED), a light emitting diode (SLD), etc. However, the present embodiment is not limited thereto.

The light transmitter 110 may radiate light toward an object OBJ under the control of the processor 130. For example, the processor 130 may set a radiation direction or a radiation angle of light generated from the light source.

The light transmitter 110 may radiate pulsed light or continuous light. Also, the light transmitter 110 may transmit light toward the object OBJ a plurality of times.

Figure 2:
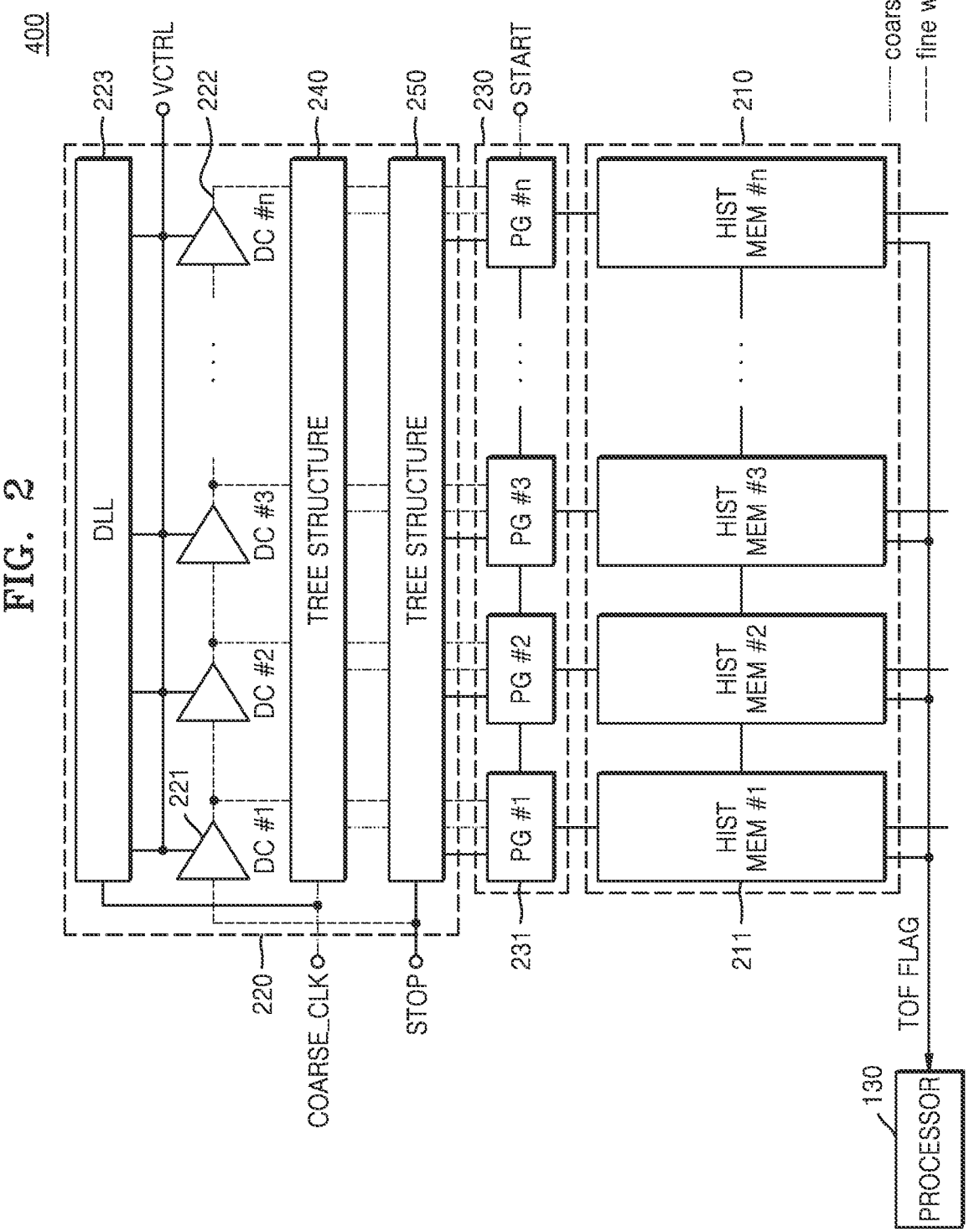
FIG. 2 is a block diagram showing a configuration of a time-to-digital converter (TDC) included in a LiDAR device according to an example embodiment.

The processor 130 may generate a start signal at the time of transmitting light and provide the start signal to a time-to-digital converter (TDC) 400 (refer to FIG. 2). The start signal may be used for calculating a time of flight (ToF) of the light.

The light receiver 120 may receive reflected light of the light radiated toward the object OBJ. To this end, the light receiver 120 may include a detector array 121 configured to include a plurality of pixels PX1, PX2, PX3, . . . PXn. A light detection element may be disposed in each of the plurality of pixels PX1, PX2, PX3, . . . PXn. According to an example embodiment, the light receiver 120 may further include an optical element for collecting reflected light of light radiated toward the object OBJ in a predetermined pixel.

When the reflected light is received, the light receiver 120 may convert the reflected light into a stop signal. The stop signal may be used for calculating a flight time of light together with the start signal. The light receiver 120 may include a TDC for measuring a time of flight (ToF) of light detected in each of the plurality of light detection elements. In another example embodiment, the TDC may be provided separately from the light receiver 120, in the LiDAR device 100.

The plurality of light detection elements are sensors capable of detecting light, and may be, for example, light receiving elements that generate electrical signals by light energy.

In one embodiment, each of the light detection element may be a single photon avalanche diode (SPAD) having high sensing sensitivity.

The processor 130 may perform a signal processing for obtaining information on the object OBJ by using the light detected by the light receiver 120. The processor 130 may determine, for example, a distance to the object OBJ based on a flight time of light reflected from the object OBJ, and perform data processing for analyzing a location and shape analysis of the object OBJ.

Information analyzed by the processor 130, that is, information about the shape and location of the object OBJ may be transmitted to another unit to be used. For example, such information may be transmitted to a controller of an autonomous driving device, such as a driverless vehicle or drone in which the LiDAR device 100 is employed. Besides above, such information may be utilized in smartphones, cell phones, personal digital assistants (PDAs), laptops, personal computers (PCs), various wearable devices, and other mobile or non-mobile computing devices.

On the other hand, when the light detection element includes an SPAD, there is a problem that the sensing sensitivity is high while noise is also increased. Accordingly, in order to calculate a reliable flight time of light by using the SPAD, the light is radiated multiple times toward the object OBJ, a histogram of light reflected from the object OBJ is generated, and then, a process of statistically analyzing the histogram is necessary.

In the related art, a method of generating a histogram by using an off-chip digital signal processor or an off-chip processor has been mainly performed. However, in the off-chip method, since the number of TDCs increases corresponding to the number of pixels, the number of TDC channels may increase as the number of pixels increases. In addition, since the increase in the channel causes the increase in a sample rate, there is a problem that a bottleneck phenomenon occurs when data is read out.

In order to solve this problem, a digital counter may be integrated into a sensor chip, but when a histogram is generated by using only digital circuits to realize a multi-channel, a chip size rapidly increases.

Hereinafter, a method of significantly reducing the chip size while implementing a TDC in an on-chip manner by generating a histogram through an analog memory will be described.

FIG. 2 is a block diagram showing a configuration of a TDC included in a LiDAR device according to an example embodiment.

Referring to FIG. 2, the TDC 400 according to an example embodiment may include a memory 210 including is a plurality of memory cells HIST MEM #1, HIST MEM #2, HIST MEM #3, . . . HIST MEM #n (211, when there is no need to distinguish below), a selector circuit 220 for sequentially selecting each of the plurality of memory cells 211, a power supply 230 supplying power to the plurality of memory cells 211 based on a stop signal, and a processor 130 for calculating a time of flight (ToF) of light based on accumulated power accumulated in the plurality of memory cells 211.

The memory 210 may include a plurality of memory cells 211. The memory 210 may be realized by a volatile memory or flash memory, such as dynamic random access memory (DRAM), static random access memory (SRAM), or by a non-volatile memory, such as phase-change random access memory (PRAM), magnetic random access memory (MRAM), and resistive random access memory (ReRAM), and ferroelectrics random access memory (FRAM), but is not limited thereto.

The memory 210 may store a histogram. The histogram may denote a graph of distribution of a stop signal over time.

Each memory cell may store distribution information for each section of a stop signal. Accordingly, each memory cell may correspond to a histogram bin. In other words, each memory cell may denote a time bin for a section of an entire time, and the processor 130 may distinguish each of the memory cells 211 by assigning a number to each of the plurality of memory cells 211. In addition, the processor 130 may obtain a total histogram by synthesizing histograms for each section stored in each of the memory cells 211.

The histogram bins may be determined by the selector circuit 220 and may be generated based on a periodic signal synchronized to the start signal.

The memory 210 may store a coarse histogram and a fine histogram.

The coarse histogram may be a graph representing the distribution of a stop signal at a first resolution. The fine histogram may be a graph representing the distribution of a stop signal at a second resolution greater than the first resolution. For example, the first histogram bin of the first resolution may be 10 ns, and the second histogram bin of the second resolution may be 0.625 ns.

The memory 210 may be reset by the processor 130 after storing the coarse histogram. Also, the memory 210 may store a fine histogram based on the coarse histogram.

The processor 130 may acquire a coarse reception time of a stop signal through a coarse histogram, and then, obtain a fine reception time of the stop signal through a fine histogram.

Figure 4:
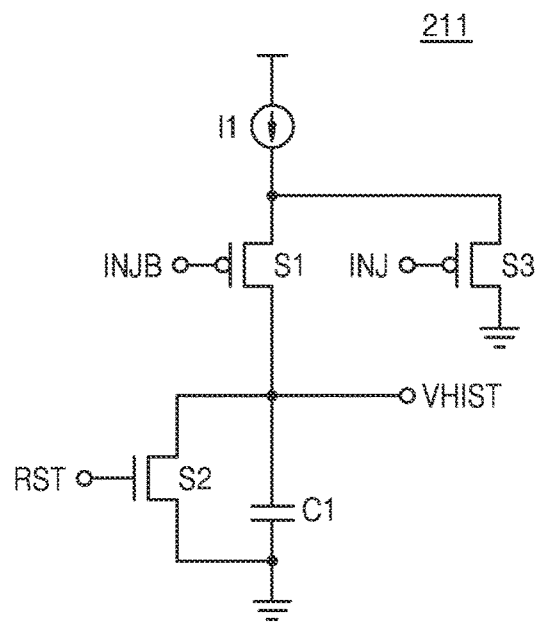
FIG. 4 shows an example circuit configuration of a memory cell of FIG. 2.

Meanwhile, the memory 210 may be an analog memory, and the coarse histogram and the fine histogram may be accumulated as analog values by the power supply 230 and a capacitor C1 (refer to FIG. 4). A method of generating a histogram will be described more in detail below in FIG. 4.

The selector circuit 220 may select a memory cell for supplying power by directly connecting to the memory cell 211 or connecting to the power supply 230.

The selector circuit 220 may sequentially select each of the plurality of memory cells 211 based on a coarse clock synchronized with a start signal generated when light is transmitted. A selection time of the selector circuit 220 may correspond to a time bin, and thus, each memory cell may correspond to a histogram bin. In other words, the histogram bins may be generated as the selector circuit 220 sequentially selects each of the plurality of memory cells 211. The processor 130 may distinguish each histogram bin by assigning a unique number to each memory cell in an ascending or descending order in the order of the memory cells selected by the selector circuit 220.

The selector circuit 220 may shift a start signal corresponding to a period of a coarse clock coarse_clk in a coarse mode (e.g., shifting the start signal at the start/end of each period/cycle of the coarse clock coarse_clk) for generating a coarse histogram. The coarse clock coarse_clk and the start signal start may be input to the power supply 230 through a coarse window path.

In order to prevent signal delay due to a serial connection of pulse generators 231, the selector circuit 220 may include a coarse clock distributor 240 that simultaneously distributes the coarse clock coarse_clk to each of the plurality of memory cells 211. The coarse clock distributor 240 may be formed in a tree structure.

The selector circuit 220 may sequentially select each of the plurality of memory cells 211 based on a shifted start signal in a coarse mode in which a coarse histogram is generated. Since the start signal is shifted in response to a period of the coarse clock, any one memory cell among the plurality of memory cells 211 may be selected from a rising edge or a falling edge of the coarse clock. In addition, since the selector circuit 220 selects corresponding memory cells by a period of the coarse clock, the period of the coarse clock in the coarse mode may correspond to a width of the coarse histogram bin.

In a coarse mode, according to the sequential selection of the selector circuit 220, a coarse histogram bin may be generated. For example, when the LiDAR device 100 detects a stop signal ranging from 0 ns to 160 ns in a coarse mode and a period of the coarse clock is 10 ns, 16 coarse histogram bins may be generated by dividing the range of 0 ns to 160 ns at every 10 ns.

The selector circuit 220 may delay a stop signal at a predetermined interval in a fine mode in which a fine histogram is generated. The selector circuit 220 may include a plurality of delay cells DC #1, DC #2, DC #3, . . . DC #n (221, when there is no need to distinguish) to delay a stop signal STOP. A delayed stop signal STOP may be input to the plurality of delay cells 221 through a fine window path.

The plurality of delay cells 221 are disposed on a delay line 222 and may be controlled by a control voltage VCTRL. Also, the plurality of delay cells 221 may output a stop signal STOP by delaying as much as a preset delay time Td. For example, when a stop signal passes through one delay cell, the stop signal may be delayed by Td, and when a stop signal passes through two delay cells, the stop signal may be delayed by 2×Td. In other words, the delay time of the stop signal may be increased corresponding to the number of passes of the delay cell.

Since a start signal and a coarse clock are synchronized with each other, the stop signal also needs to be synchronized with the period of the coarse clock to calculate a reception time of light. The selector circuit 220 may include a delay locked loop 223 for synchronizing a delayed stop signal to a period of a coarse clock to calculate a reception time of light.

The LiDAR device 100 of the present disclosure may have a structure in which one delay locked loop 223 is shared by two column TDCs. As the LiDAR device 100 includes a delay locked loop DLL 223 rather than a phase locked loop PLL, low power driving of the TDC 400 is possible, and a high resolution histogram may be generated.

In a fine mode in which a fine histogram is generated, the selector circuit 220 may sequentially select each of the plurality of memory cells 211 based on a delayed stop signal. The selector circuit 220 may select any one memory cell among the plurality of memory cells 211 for each output of a delay cell. Since the selector circuit 220 selects a corresponding memory cell by a delay time Td of a delay cell, the delay time Td of the delay cell in a fine mode may correspond to a width of a fine histogram bin.

In the fine mode, according to the sequential selection of the selector circuit 220, a fine histogram bin may be generated. For example, when the LiDAR device 100 precisely detects a stop signal received in a range of 70 ns to 80 ns in a fine mode and a delay time of a delay cell is 0.625 ns, 16 fine histogram bins may be generated by dividing the range of 70 ns to 80 ns at every 0.625 ns. Accordingly, a delay time Td of a delay cell in a fine mode may be related to the resolution of a flight time.

The power supply 230 may supply power to the plurality of memory cells 211 based on a stop signal generated when light is received. In one embodiment, the power source may denote a current. To this end, the power supply 230 may include a plurality of pulse generators PG #1, PG #2, PG #3, . . . PG #n, (231, when there is no need to distinguish) to generate a current pulse.

Each pulse generator 231 may be connected to the selector circuit 220 and receive a selection signal of a memory cell from the selector circuit 220. Also, each pulse generator may be connected to an input terminal of each of the plurality of memory cells 211 to supply a current pulse to each of the plurality of memory cells 211 based on a stop signal.

The power supply 230 may generate a coarse histogram and a fine histogram by supplying power to each of the plurality of memory cells 211. The power supply 230 may supply power to any one memory cell among the plurality of memory cells 211 based on a stop signal. Histograms may be accumulated in each histogram bin by power supplied from the power supply 230.

In a coarse mode, the power supply 230 may supply a current to a memory cell selected by the selector circuit 220 at a time when a stop signal is received. To this end, the selector circuit 220 may include a stop signal distributor 250 that simultaneously distributes a stop signal to each of a plurality of memory cells 211. The stop signal distributor 250 may have a tree structure.

In a fine mode, the power supply 230 may supply a current to a memory cell selected by the selector circuit 220 at a time when a time window generated based on a coarse histogram ends.

A method of power supply of the power supply 230 in a coarse mode and a fine mode will be described more in detail below with reference to FIG. 3.

The processor 130 may calculate a flight time of light based on accumulated power information accumulated in the plurality of memory cells 211. The accumulated power information may be a coarse histogram and a fine histogram accumulated as analog values in the plurality of memory cells 211.

The processor 130 may calculate an approximate flight time of light based on first information of accumulated power accumulated in the plurality of memory cells 211 in a coarse mode. When a coarse flight time of light is calculated, the processor 130 may reset all of the plurality of memory cells 211. The processor 130 may accurately calculate the flight time of light based on second information of accumulated power information accumulated in the plurality of memory cells 211 in a fine mode.

The processor 130 may determine a distance to an object based on a precise flight time of light and perform a data processing for analyzing a position and shape of the object.

The memory 210, the selector circuit 220, the power supply 230, and the processor 130 of FIG. 2 may be configured in an on-chip type and integrated into a single chip.

Figure 3:
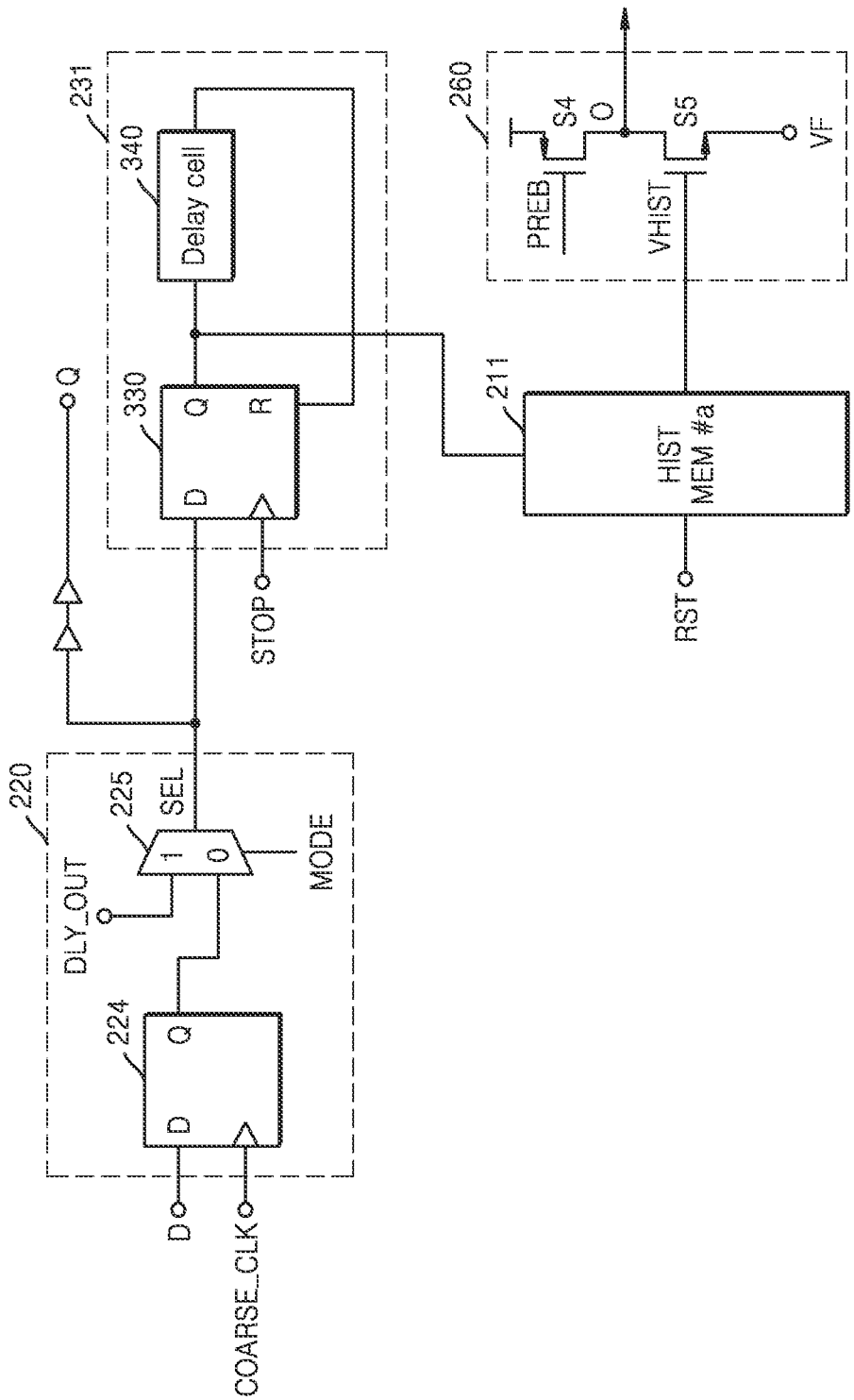
FIG. 3 shows an example circuit configuration of the TDC of FIG. 2.

FIG. 3 shows an example circuit configuration of the TDC of FIG. 2.

Referring to FIG. 3, the TDC according to an example embodiment may include the selector circuit 220, the pulse generator 231, the memory cell 211, and a comparator circuit 260.

The selector circuit 220 may include a shift register 224 and a multiplexer 225.

The shift register 224 may output an output signal Q by synchronizing an input signal D with a coarse clock coarse_clk. In one embodiment, the shift register 224 may include a D flip-flop DFF that shifts a start signal in response to a period of the coarse clock coarse_clk (e.g., at the start/end of the period of the coarse clock coarse_clk).

An input node of the shift register 224 may be connected to an output node of the shift register 224 included in a previous TDC. Accordingly, in the case of a first TDC, an input signal D input to the shift register 224 is a start signal START, and in the case of a TDC after the first TDC, an input signal D input to the shift register 224 may be an output signal output by the shift register 224 included in the previous TDC.

The shift register 224 may synchronize a coarse clock coarse_clk at the time of optical transmission by synchronizing a start signal D and the coarse clock coarse_clk. The shift register 224 may output a first selection signal for selecting any one memory cell among the plurality of memory cells 211 whenever the coarse clock coarse_clk rises.

Meanwhile, as shown in FIG. 2, the selector circuit 220 may include a plurality of delay cells 221 and a delay fixed loop 223, and whenever a stop signal is delayed, may output a second selection signal for selecting any one memory cell among the plurality of memory cells 211.

The multiplexer 225 may select a coarse mode for generating a coarse histogram or a fine mode for generating a fine histogram based on a mode input signal MODE. The multiplexer 225 may output a first selection signal output by the shift register 224 in a coarse mode (mode '0'), and may output a second selection signal output by a delay cell in a fine mode (mode '1').

The pulse generator 231 may include a D flip-flop 330 and a delay cell 340. The D flip-flop 330 may determine the supply of a current pulse to the memory cell 211, and the delay cell 340 may determine a holding time t of the current pulse. The holding time t of the current pulse may be substantially the same as the delay time t of the delay cell 340. The pulse generator 231 may supply a current pulse to the memory cell 211 based on a first selection signal or a second selection signal.

The memory cell 211 may include a first switch S1 connected to the pulse generator 231, a capacitor C1 connected to the first switch S1 and accumulating voltages generated by the current pulse, a second switch S2 connected in parallel to the capacitor C1 and discharging the capacitor C1, and a third switch S3 connected in parallel to the first switch S1 and maintaining a constant voltage at an input terminal. The memory cell 211 may store a histogram for each section as an analog value based on a current pulse. The histogram for each section may be an accumulated voltage VHIST of the power (or energy) that is accumulated in the capacitor C1.

The comparator circuit 260 is connected to the output terminal of the memory cell 211 and compares the accumulated voltage VHIST accumulated in the capacitor C1 with a reference voltage VREF=VF+Vth. When the accumulated voltage VHIST is greater than or equal to the reference voltage VREF, the comparator circuit 260 may output the accumulated voltage VHIST. To this end, the comparator circuit 260 may include a fourth switch S4 for maintaining the reference voltage VREF and a fifth switch S5 connected to the fourth switch S4 and operating above the reference voltage VREF. The fourth switch S4 and the fifth switch S5 may be a bipolar junction transistor (BJT) or a field-effect transistor (FET), but are not limited thereto. As the comparator circuit 260 is configured as a 2-T (transistor), circuit integration may be improved.

The processor 130 may calculate a coarse reception time of a stop signal based on an accumulated voltage VHIST output by the comparator circuit 260 in a coarse mode. Also, the processor 130 may generate a time window for a coarse reception time of a stop signal. In addition, the processor 130 may calculate a precise reception time of a stop signal within a time window based on an accumulated voltage VHIST output by the comparator circuit 260 through a fine mode.

Although, a selection signal is changed according to a coarse mode and a fine mode, but operating methods of the pulse generator 231, the memory cell 211, and the comparator circuit 260 may be the same in the coarse mode and the fine mode.

When reviewing an operating method of the TDC in a coarse mode and a fine mode, the processor 130 may output a coarse mode selection signal to the multiplexer 225, and the multiplexer 225 may output a first selection signal based on the coarse mode selection signal.

In the coarse mode, a first selection signal is high whenever the coarse clock coarse_clk rises and a stop signal STOP may rise when light is detected.

Meanwhile, as depicted in FIG. 2, since the plurality of memory cells 211 share a stop signal through a tree structure, when the TDC receives a stop signal, a stop signal may rise at the same time regardless of the location of the plurality of memory cells 211.

When a stop signal rises in a memory cell in which a first selection signal is high, the pulse generator 231 may generate an injection signal INJ as much as the delay time t of the delay cell 340. Also, the injection signal INJ may be transmitted to the memory cell 211.

Meanwhile, whenever the injection signal INJ is applied to the memory cell 211, a charge of I1×t (?) may be charged in the capacitor C1. Accordingly, a voltage may be accumulated in the capacitor C1 as an analog value in proportion to the number n of injections of the injection signal INJ. In other words, the capacitor C1 may store the accumulated voltage VHIST proportional to the number n of injections of the injection signal INJ.

When the fourth switch S4 of the comparator circuit 260 is a P-type metal-oxide-semiconductor (PMOS), an output node O may be high by a precharge voltage. At this time, a voltage of the output node O may be a reference voltage VREF. The comparator circuit 260 may output the accumulated voltage VHIST when the accumulated voltage VHIST of the memory cell 211 is greater than or equal to the reference voltage VREF.

The processor 130 may store information about the memory cell 211 outputting an accumulated voltage VHIST equal to or greater than the reference voltage VREF in a coarse mode. The memory cell 211 outputting an accumulated voltage VHIST equal to or greater than the reference voltage VREF in a coarse mode may be referred to as a coarse memory cell. The meaning that the processor 130 stores information about the coarse memory cell in a coarse mode may be the same as the meaning of storing a coarse histogram bin.

After storing information about the coarse memory, the processor 130 may reset the accumulated voltage accumulated in each of the plurality of memory cells 211. In other words, after storing information about the coarse memory, the processor 130 may erase the entire coarse histogram stored in the plurality of memory cells 211.

The processor 130 may generate a time window corresponding to information about a coarse memory cell. Since the information about the coarse memory cell corresponds to a coarse histogram bin, a lower limit of the time window may be the same as a lower limit of the coarse histogram bin, and an upper limit of the time window may be the same as an upper limit of the coarse histogram bin.

After erasing all of the plurality of memory cells 211, the processor 130 may output a fine mode selection signal to the multiplexer 225 for mode change. The multiplexer 225 may output a second selection signal based on the fine mode selection signal.

In the fine mode, the second selection signal may be propagated through the delay cell 221 included in the selection unit 220 and may be terminated when the time window ends. Any one memory cell of the plurality of memory cells 211 may be selected according to the propagation of the second selection signal. The selector circuit 220 may select the memory cell 211 in which the second selection signal is high.

The pulse generator 231 may supply a current pulse to the memory cell 211 in which the second selection signal is high when the time window ends.

A method of supplying a current pulse and a method of generating a fine histogram in a fine mode are the same as the method of supplying a current pulse and the method of generating a coarse histogram bin in a coarse mode. In other words, in the fine mode, the pulse generator 231 may transmit an injection signal INJ as much as a delay time t to the memory cell 211 in which the second selection signal is high when the time window ends. Also, whenever the injection signal INJ is applied to the memory cell 211, a charge of I1×t may be charged in the capacitor C1. Accordingly, a voltage may be accumulated in the capacitor C1 as an analog value in proportion to the number n of injections of the injection signal INJ.

In addition, the operating method of the comparator circuit 260 in a fine mode is the same as the operating method of the comparator circuit 260 in a coarse mode. In other words, when the accumulated voltage VHIST of the memory cell 211 is equal to or greater than the reference voltage VREF, the comparator circuit 260 may output the accumulated voltage VHIST.

The processor 130 may store information about the memory cell 211 that outputs an accumulated voltage VHIST equal to or greater than the reference voltage VREF in a fine mode. In a fine mode, the memory cell 211 that outputs an accumulated voltage VHIST equal to or greater than the reference voltage VREF may be referred to as a fine memory cell. The meaning that the processor 130 stores information about the coarse memory cell in a fine mode may be the same as the meaning that the processor 130 stores a fine histogram bin.

The processor 130 may calculate a flight time of light based on information about at least one fine memory cell that outputs an accumulated voltage VHIST equal to or greater than the reference voltage VREF among the plurality of memory cells 211.

FIG. 4 shows an example circuit configuration of the memory cell 211 of FIG. 2.

Referring to FIG. 3, the memory cell 211 may include: a first switch S1 connected to the pulse generator 231; a capacitor C1 connected to the first switch S1 and accumulating a voltage generated by a current pulse; a second switch S2 that is connected in parallel to the capacitor C1 and discharges the capacitor C1, and a third switch S3 connected in parallel to the first switch S1 and maintaining a constant voltage at an input terminal. The first switch S1, the second switch S2, and the third switch S3 may be bipolar junction transistors (BJTs) or field effect transistors (FETs), but are not limited thereto.

The first switch S1 may be turned on or off based on an injection signal INJ. FIG. 4 illustrates that, when the first switch S1 is a PMOS, a reverse bias of an injection signal INJ is applied to a gate.

Whenever an injection signal INJ is applied to the first switch S1, the first switch S1 is turned on, and accordingly, a charge of I1×t may be charged to the capacitor C1. As the capacitor C1 is charged, an accumulated voltage VHIST according to Equation 1 below may be measured at both ends of the capacitor C1.

$$VHIST = \frac{n \times I1 \times t1}{C} \quad \text{[Equation 1]}$$

Here, n is the number of injections of the injection signal INJ, I1 is power supplied by the power supply 230, t1 is power supply time of the power supply 230, C is a capacitance of the capacitor C1.

In the LiDAR device 100 of the present disclosure, since a voltage is accumulated in the capacitor C1 as an analog value in proportion to the number n of injections of the injection signal INJ, a digital counter is unnecessary. Accordingly, a TDC may be manufactured in an on-chip form, and circuit integration is significantly increased.

The second switch S2 may discharge the capacitor C1. The second switch S2 may connect both ends of the capacitor C1 based on a discharge signal RST. When information about a coarse memory cell is obtained, the processor 130 may discharge the capacitor C1 by outputting the discharge signal RST to the memory cell 211.

The third switch S3 is turned on and off based on an injection signal INJ, and may maintain a constant voltage at an input terminal.

Figure 5:
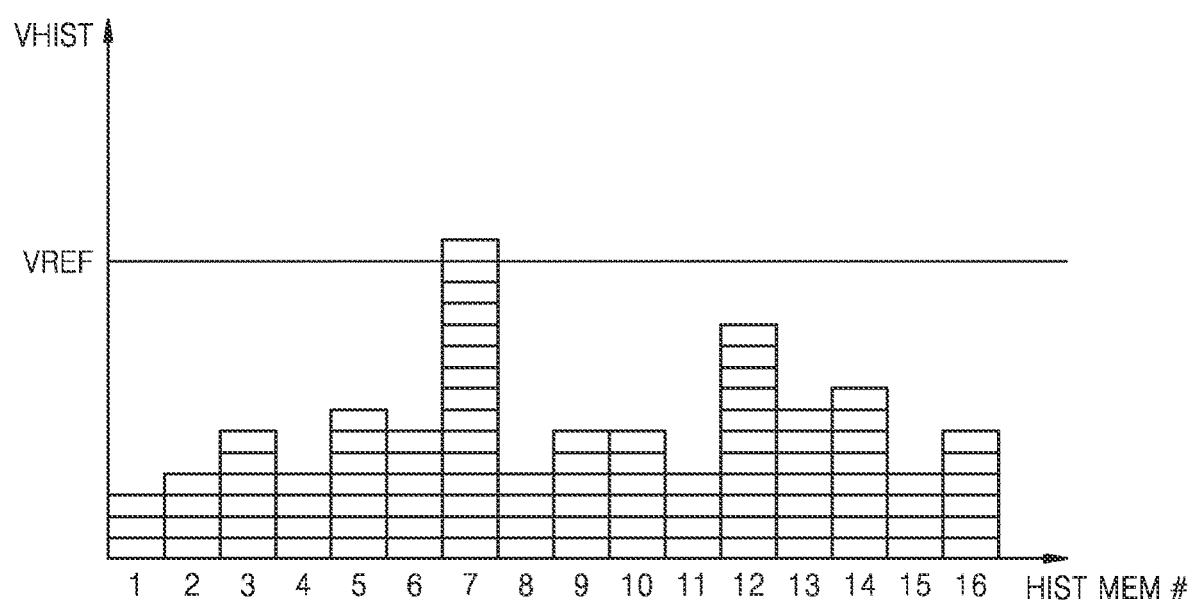
FIG. 5 is a diagram illustrating a coarse histogram generated by a LiDAR device according to an example embodiment.

FIG. 5 is a diagram illustrating a coarse histogram generated by the LiDAR device 100 according to an example embodiment.

In FIG. 5, the horizontal axis may represent the number of the memory cells 211. Since each memory cell 211 denotes a time bin for a certain section of an entire time, it may denote that the larger the number of the memory cells 211, the slower the detection time of light.

In FIG. 5, the vertical axis denotes a level of an accumulated voltage stored in the memory cell 211. It may denote that the larger the level of the accumulated voltage, the greater the number n of injections of the injection signal INJ.

FIG. 5 illustrates a coarse histogram in which the processor 130 sets a range between 0 ns and 160 ns as a total detection time, and divides the range of 0 ns to 160 ns at every 10 ns. Therefore, 16 coarse histogram bins are generated, and a width of each coarse histogram bin is 10 ns. In FIG. 5, the coarse histogram for each section is stored in each memory cell 211. However, the coarse histogram of FIG. 5 is an example, and the total detection time, the width of the coarse histogram bin, etc. may be increased or decreased according to the number of memory cells, the period of the coarse clock, etc.

Referring to FIG. 5, in a coarse mode, each memory cell 211 may store a coarse histogram for each section. The processor 130 may identify a coarse memory cell based on the coarse histogram for each section, and store information about the coarse memory cell. In FIG. 5, since the memory cell that outputs an accumulated voltage VHIST equal to or greater than the reference voltage VREF is number 7, the processor 130 may store information about the coarse histogram bin of the memory cell 7.

The processor 130 may calculate that the coarse histogram bin of the coarse memory cell is a coarse reception time of a stop signal. The coarse reception time of the stop signal may be referred to as a coarse time. In FIG. 5, since the coarse histogram bin of the memory cell 7 is 60 ns to 70 ns, the processor 130 may calculate that the stop signal has a coarse time of 60 ns to 70 ns.

After storing information about the coarse memory, the processor 130 may erase the entire coarse histogram stored in the plurality of memory cells 211. Also, the processor 130 may generate a time window corresponding to information about the coarse memory cell. In FIG. 5, the processor 130 may generate a time window ranging from 60 ns to 70 ns.

On the other hand, since the coarse time refers to a coarse reception time of a stop signal, it is necessary to generate a fine histogram in order to calculate a precise reception time of the stop signal. Hereinafter, a method of calculating a precise reception time of a stop signal through a fine histogram will be described.

Figure 6:
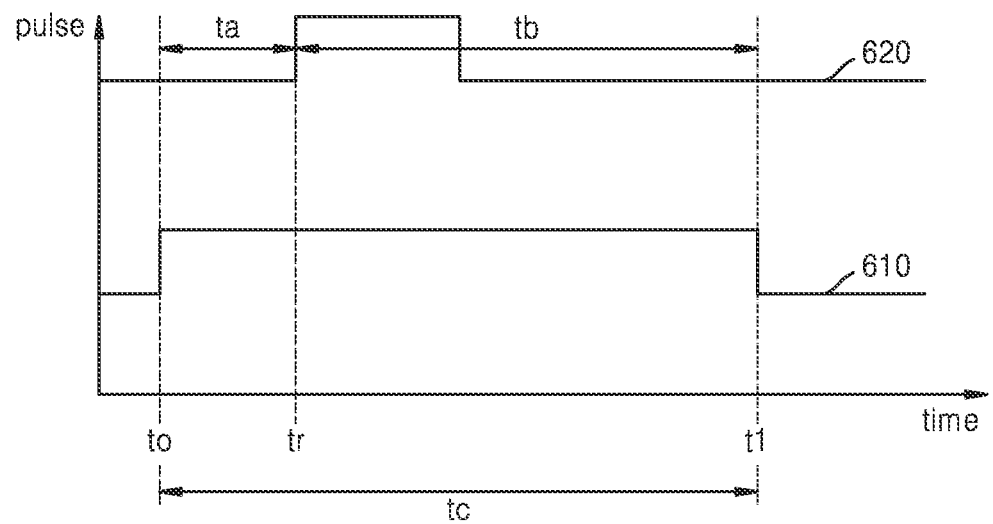
FIG. 6 is a diagram for explaining a method of calculating a reception time of a stop signal in a time window according to an example embodiment.

FIG. 6 is a diagram for explaining a method of calculating a reception time of a stop signal in a time window according to an example embodiment.

FIG. 6 illustrates pulses of a stop signal 620 received within a time window 610. In FIG. 6, a reception time of the stop signal 620 received in the time window 610 may be derived by calculating a first time (ta) from a lower limit t0 of the time window 610 to a first rising edge tr of the stop signal 620 or by calculating a second time tb from an upper limit t1 of the time window 610 to a rising edge tr of the stop signal 620.

Hereinafter, a method of calculating a reception time of the stop signal 620 by using the second time tb will be described, but the LiDAR device 100 of the present disclosure may calculate a reception time of the stop signal 620 by using the first time ta.

Figure 7:
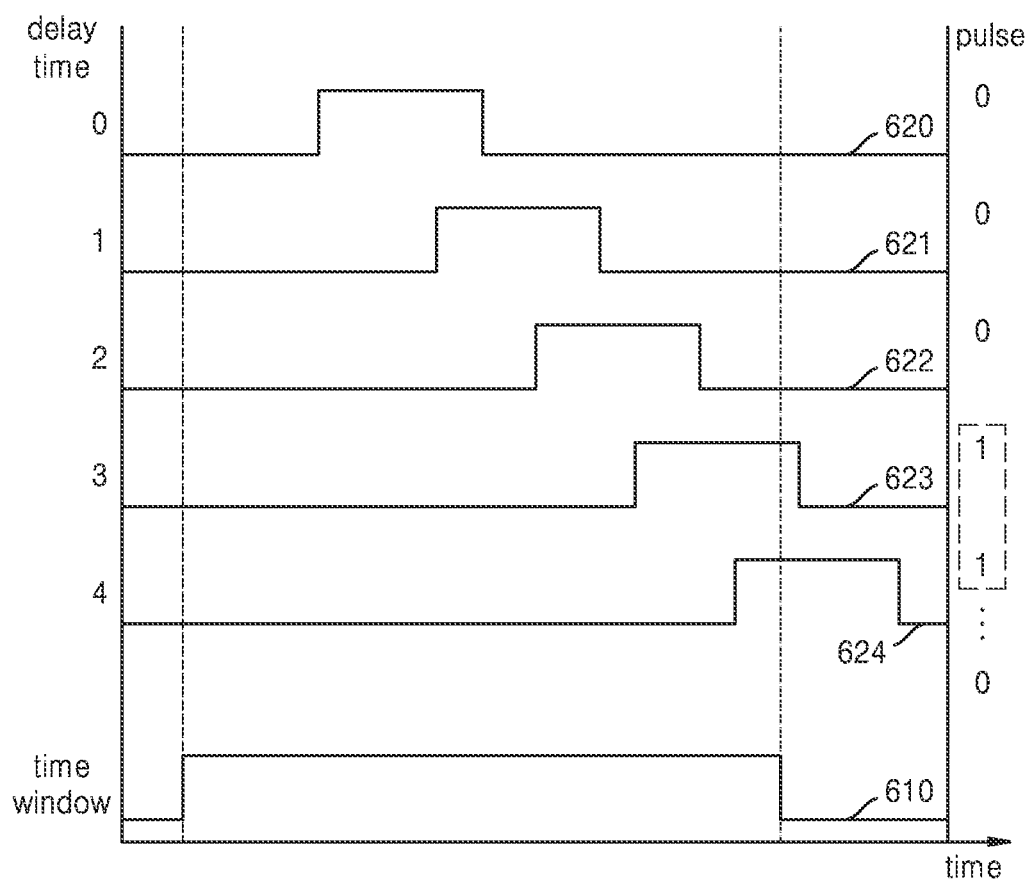
FIG. 7 is a diagram for explaining a method of generating a fine histogram according to an example embodiment.

FIG. 7 is a diagram for explaining a method of generating a fine histogram according to an example embodiment.

Referring to FIG. 7, the plurality of delay cells 221 may output the stop signal 620 with delay. The delay time of the stop signal 620 may increase as the number of delay cells through which the stop signal 620 passes increases. In FIG. 7, a first stop signal 621 that is the stop signal 620 delayed once, a second stop signal 622 that is the stop signal 620 delayed twice, a third stop signal 623 that is the stop signal 620 delayed three times, and a fourth stop signal 624 that is the stop signal 620 delayed four times are depicted.

As the stop signal 620 passes through the plurality of delay cells 221, the memory cell 211 in which the stop signal 620 is high may be changed, and the selector circuit 220 may sequentially select the memory cells 211 in which the stop signal 620 is high.

The pulse generator 231 may supply a current pulse to the memory cell 211 selected by the selector circuit 220 at the end of the time window 610. In FIG. 7, the pulse generator 231 may supply a current pulse to the memory cell 211 corresponding to the third stop signal 623 and the memory cell 211 corresponding to the fourth stop signal 624.

Whenever a current pulse is supplied to the memory cell 211, a voltage may be accumulated in the capacitor C1. A fine histogram may be generated by the accumulated voltage accumulated in the capacitor C1.

Figure 8:
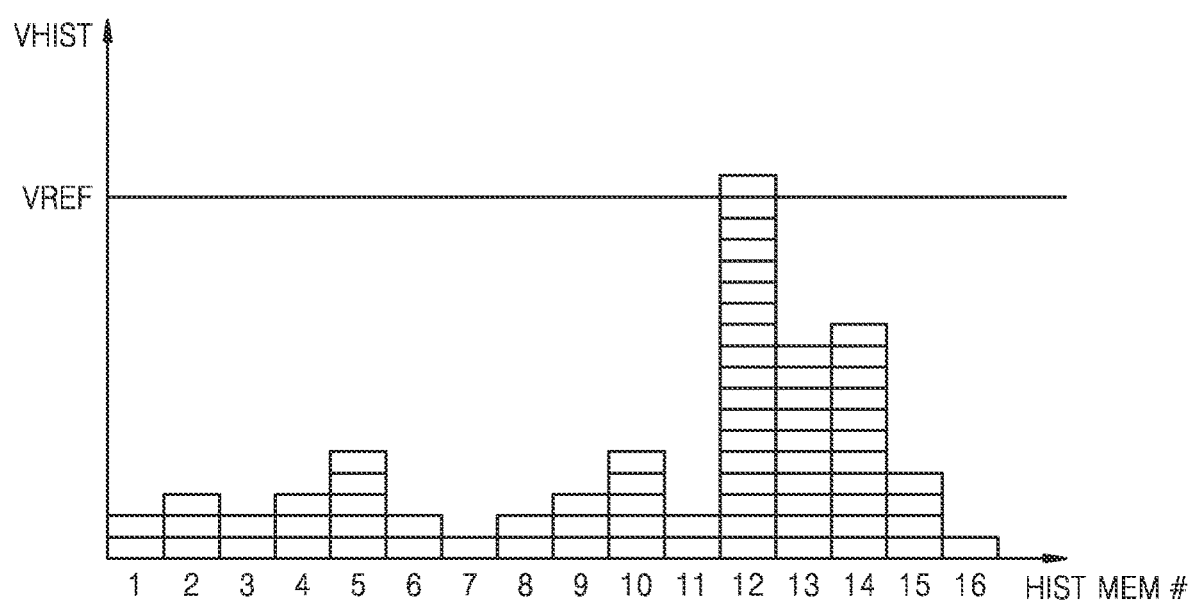
FIG. 8 is a diagram illustrating a fine histogram generated by a LiDAR device according to an example embodiment.

FIG. 8 is a diagram illustrating a fine histogram generated by the LiDAR device according to an example embodiment.

In FIG. 8, the number of the memory cells 211 in the horizontal axis is the same as the number of the memory cells in FIG. 5. Also, the level of the accumulated voltage on the vertical axis in FIG. 8 is the same as the level of the accumulated voltage in FIG. 5.

FIG. 8 illustrates a fine histogram in which a range between 60 ns and 70 ns is set as a time window, and the range of 60 ns to 70 ns is divided by every 0.625 ns. Accordingly, 16 fine histogram bins are generated, and a width of each fine histogram bin is 0.625 ns. In FIG. 8, fine histograms for each section are stored in each memory cell 211. However, the fine histogram of FIG. 8 is an example, and the time window, the width of the fine histogram bin, etc. may be increased or decreased according to the number of memory cells, the delay time of the delay cells 221, etc.

Referring to FIG. 8, in a fine mode, a fine memory cell may be identified. In FIG. 8, since the number of a memory cell that outputs an accumulated voltage VHIST equal to or greater than the reference voltage VREF is 12, the processor 130 may store information about the fine histogram bin of the memory cell 12.

The processor 130 may calculate a time from an upper limit of the time window to a rising edge of a stop signal based on the fine histogram bin. In FIG. 8, since the fine histogram bin of memory cell 12 is 6.875 ns to 7.5 ns, the processor 130 may calculate that the time from the upper limit of the time window to the rising edge of the stop signal is 6.875 ns to 7.5 ns.

The processor 130 may calculate a precise reception time of the stop signal based on the time window and the fine histogram bin. The precise reception time of the stop signal may be referred to as a fine time. In FIG. 8, since the time window in is 60 ns to 70 ns, the processor may calculate that the fine time of the stop signal is 62.5 ns to 63.125 ns.

As described above, since the LiDAR device 100 of the present disclosure does not require a separate memory cell for storing the fine histogram, miniaturization of the TDC is possible. In addition, the LiDAR device 100 of the present disclosure generates a coarse histogram and a fine histogram through the pulse generator 231 and the capacitor C1 without a digital counter, thereby enabling on-chip of the TDC.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light detection and ranging (LiDAR) device comprising:
    a light transmitter configured to emit a light to an object;
    a light receiver configured to receive the light that is reflected from the object and convert the reflected light into a stop signal when the light is received, wherein an amplitude of the stop signal is represented using a logic one (1) state and a logic zero (0) state;
    a memory comprising a plurality of memory cells;
    a selector circuit comprising at least one shift register configured to shift a start signal corresponding to a period of a coarse clock, to sequentially select each of the plurality of memory cells based on the coarse clock synchronized with the start signal that is generated when the light is transmitted from the light transmitter, and configured to perform a plurality of delay operations on the stop signal to obtain a plurality of delayed stop signals;
    a power supply configured to supply current to a corresponding memory cell that is selected by the selector circuit among the plurality of memory cells when a delayed stop signal for the corresponding memory cell among the plurality of delayed stop signals has the logic 1 state during the period of the coarse clock; and
    a processor configured to determine a time of flight (ToF) of the light based on information of electric charge accumulated in the plurality of memory cells.

2. The LiDAR device of claim 1, wherein the selector circuit is further configured to
    shift the start signal in response to the period of the coarse clock in a first histogram generation mode for generating a coarse histogram that represents a distribution of the plurality of delayed stop signals at a first resolution, and
    sequentially select each of the plurality of memory cells based on the shifted start signal.

3. The LiDAR device of claim 1, wherein the selector circuit comprises a coarse clock distributor configured to simultaneously distribute the coarse clock to each of the plurality of memory cells.

4. The LiDAR device of claim 1, wherein the shift register comprises at least one D flip-flop (DFF) configured to shift the start signal corresponding to the period of the coarse clock.

5. The LiDAR device of claim 1, wherein the selector circuit comprises a stop signal distributor configured to simultaneously distribute the plurality of delayed stop signals to the plurality of memory cells, respectively.

6. The LiDAR device of claim 1, wherein the processor is further configured to generate a coarse histogram that represents a distribution of the plurality of delayed stop signals at a first resolution during the period of the coarse clock.

7. The LiDAR device of claim 1, wherein the power supply comprises pulse generators respectively connected to an input terminal of each of the plurality of memory cells and configured to supply the current to each of the plurality of memory cells.

8. The LiDAR device of claim 1, wherein each of the plurality of memory cells comprises:
    a first switch connected to the power supply;
    a capacitor connected to the first switch and accumulate the electric charge generated by the power supply; and
    a second switch connected in parallel to the capacitor and configured to discharge the capacitor.

9. The LiDAR device of claim 8, wherein each of the plurality of memory cells further comprises a third switch connected in parallel to the first switch and configured to maintain a constant voltage at an input terminal of each of the plurality of memory cells.

10. The LiDAR device of claim 9, further comprising a comparator circuit connected to an output terminal of each of the plurality of memory cells and configured to compare a voltage of the capacitor in which the electric charge is accumulated, with a reference voltage, and output the voltage of the capacitor when the voltage of the capacitor is greater than or equal to the reference voltage.

11. The LiDAR device of claim 10, wherein the comparison circuit comprises a fourth switch configured to maintain the reference voltage and a fifth switch connected to the fourth switch and configured to be operated above the reference voltage.

12. The LiDAR device of claim 1, wherein the processor is further configured to obtain the information of the electric charge by measuring a voltage of each of a plurality of capacitors that are included in the plurality of memory cells, respectively.

13. The LiDAR device of claim 1, wherein the processor is further configured to store information about at least one coarse memory cell having a voltage greater than or equal to a reference voltage, among the plurality of memory cells, and reset the voltage of the least one coarse memory cell.

14. The LiDAR device of claim 13, wherein the processor is further configured to generate a time window corresponding to the information about the at least one coarse memory cell, and corresponding to the period of the coarse clock.

15. The LiDAR device of claim 1, wherein the selector circuit is further configured to
    sequentially select each of the plurality of memory cells based on the coarse clock, in a first histogram generation mode for generating a coarse histogram that represents a distribution of the plurality of delayed stop signals at a first resolution,
    delay the stop signal at a preset interval in a second histogram generation mode for generating a fine histogram that represents a distribution of the plurality of delayed stop signals at a second resolution higher than the first resolution, and
    sequentially select each of the plurality of memory cells based on the plurality of delayed stop signals.

16. The LiDAR device of claim 15, wherein the selector circuit comprises a plurality of delay cells delaying the stop signal and a delay locked loop (DLL) for synchronizing the plurality of delayed stop signals with the period of the coarse clock.

17. The LiDAR device of claim 1, wherein the power supply is further configured to supply, in a second histogram generation mode for generating a fine histogram that represents a distribution of the plurality of delayed stop signals at a second resolution, the current to the corresponding memory cell selected by the selector circuit based on a coarse histogram that represents a distribution of the plurality of delayed stop signals at a first resolution, and wherein the second resolution is higher than the first resolution.

18. The LiDAR device of claim 1, wherein the processor is further configured to determine the ToF based on information about at least one fine memory cell having a voltage greater than or equal to a reference voltage among the plurality of memory cells.

19. The LiDAR device of claim 1, wherein the light receiver comprises a single photon avalanche diode (SPAD).

20. The LiDAR device of claim 1, wherein the memory, the selector circuit, the power supply, and the processor are integrated into a single chip.

\* \* \* \* \*